Figure 2:
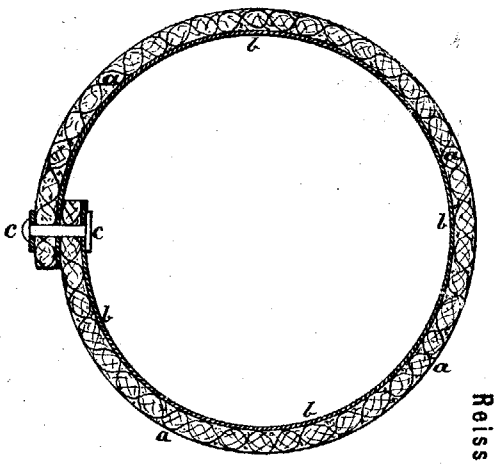

C. G. BOYD.

Elastic Hose-Tubing.

No. 5,731. Reissued Jan. 20, 1874.

Witnesses:

A. Hörmann

W. C. Dey.

Signature:

C. G. Boyd by her atty

F. D. Stetson

AM. PHOTO-LITHOGRAPHIC Co. N.Y. (OSBORNE'S PROCESS)

UNITED STATES PATENT OFFICE.

CATHARINE G. BOYD, OF NEW YORK, N. Y., ASSIGNEE, BY MESNE ASSIGNMENTS, OF ALEXANDER BOYD AND SAMUEL WHEELWRIGHT, EXECUTORS OF JOHN C. BOYD, DECEASED.

IMPROVEMENT IN ELASTIC HOSE-TUBING.

Specification forming part of Letters Patent No. 25,239, dated August 30, 1859; extended seven years; reissue No. 5,731, dated January 20, 1874; application filed November 17, 1873.

*To all persons to whom these presents shall come, greeting:*

Whereas, JOHN C. BOYD, of Boston, in the county of Suffolk and State of Massachusetts, invented certain new and useful Improvements in the Manufacture of Hose or Flexible Tubes for Conveying Fluids, for which Letters Patent of the United States were issued, bearing date August 30, 1859, for fourteen years therefrom, which have, for satisfactory reasons shown, been since extended for seven years further; and whereas, I, CATHARINE G. BOYD, of New York city, the widow of the deceased, have, by virtue of deeds of assignment duly recorded in the United States Patent Office, become possessed of the entire right and title to the said patent and invention; and whereas, being advised by counsel that the said Letters Patent are not fully available by reason of a defective specification, due to inadvertence and mistake, I have petitioned for leave to surrender the said Letters Patent, and to receive new Letters Patent for the remainder of the said extended term on a new and amended specification;

Now, be it known that the following description, taken in connection with the accompanying drawing hereinafter referred to, forms a full and exact specification of the same, wherein I have set forth the nature and principle of the improvements, by which the invention may be distinguished from all others of a similar class.

It has long been considered desirable to obtain a flexible pipe for conveying fluids which should answer the purpose as well as leather hose, the great expense of which has proved a serious objection to its use. Rubber hose, as now manufactured, has proved a tolerable substitute for leather hose, but does not possess the durability of the latter, as the fabric between the two sheets of rubber, so placed in the ordinary manufacture of rubber hose, soon becomes rotted by the chemical action of the rubber upon it.

The Grenoble hose, (so called,) which consists of a thick woven fabric of fibrous material, gets saturated on its inside, which is not accessible to the drying action of air and heat, and often mildews and rots before it can become dried.

To obtain a hose which shall possess all the durability of leather hose, and yet have the advantages of greater lightness, flexibility, and cheapness, are the objects aimed at and secured by the present invention, which consists in forming the hose of a thick and strong woven fabric, of cotton, hemp, or other fibrous materials, with its edges overlapped and strongly fastened, and lined with india-rubber or analogous water-proof composition. By this means, while an extremely, light, strong, and cheap hose is made, its durability is very great, as the rubber lining not only presents a smooth surface to the passage of fluids through the tube, but also prevents the fabric from being saturated with water.

The figures of the accompanying plate of drawings represent the improvements.

Figure 1:
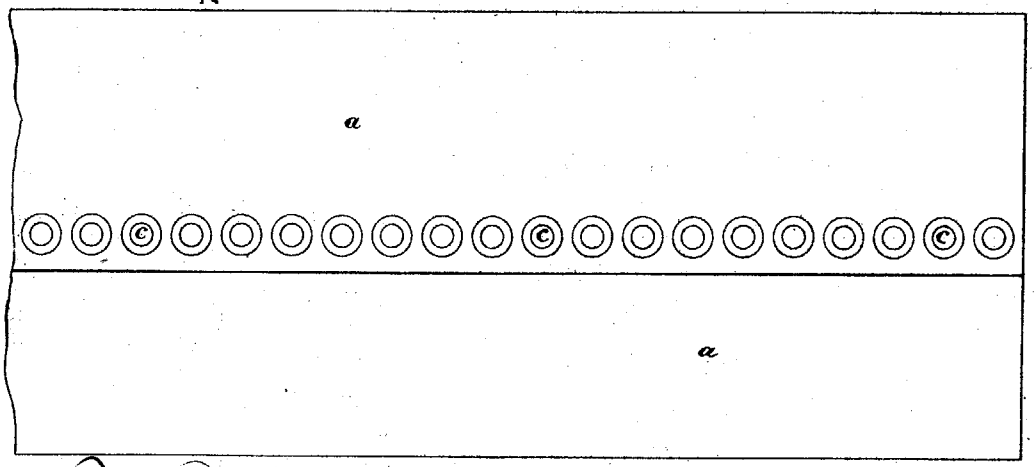

Figure 1 is an elevation of the new hose. Fig. 2 is a transverse vertical section of the same.

A A in the drawings represent the outside or covering of the hose, woven in a three, four, or more ply, as may be desirable, in the ordinary manner, and, while in the piece or sheet, is fastened, by suitable means, to a sheet of india-rubber or gutta-percha, *b b*. This attachment and fastening may be effected by passing the woven fabric and the india-rubber or gutta-percha sheet, with cement between them, through calender-rolls; and the rubber or gutta-percha sheet is made and vulcanized by the mode commonly practiced in the manufacture of india-rubber. The fabric thus constituted of the woven exterior and the water-proof lining is then formed into a tube of any desired diameter, and its lapping edges secured together, the result being a tight, strong, flexible, and cheap hose, and one which is not liable to deteriorate or decay.

What is claimed as new, and the invention of the said JOHN C. BOYD, deceased, is—

The flexible hose, formed of a strip of woven material, lined with rubber or other water-proof composition, and having its opposite edges lapped and united, so as to form a hose, substantially as herein set forth.

In testimony whereof I have hereunto set my hand this 5th day of November, 1873, in presence of two subscribing witnesses.

CATHARINE G. BOYD.

Witnesses:

ARNOLD HÖRMANN.

WM. C. DEY.